(12) United States Patent
Kochanski

(10) Patent No.: US 7,144,264 B2
(45) Date of Patent: Dec. 5, 2006

(54) ADD-ON ELECTRICAL DISTRIBUTION ASSEMBLY

(75) Inventor: Walter T. Kochanski, Kendallville, IN (US)

(73) Assignee: Pent Technologies, Inc., Kendallville, IN (US)

( * ) Notice: Subject to any disclaimer, the term of this patent is extended or adjusted under 35 U.S.C. 154(b) by 0 days.

(21) Appl. No.: 10/984,484

(22) Filed: Nov. 9, 2004

(65) Prior Publication Data
US 2005/0130476 A1 Jun. 16, 2005

Related U.S. Application Data

(60) Provisional application No. 60/518,720, filed on Nov. 10, 2003.

(51) Int. Cl.
*H01R 4/60* (2006.01)
(52) U.S. Cl. .................................................. 439/215
(58) Field of Classification Search ................ 439/215, 439/634, 211, 652, 653, 209, 210, 216
See application file for complete search history.

(56) References Cited

U.S. PATENT DOCUMENTS

| 4,775,328 A | 10/1988 | McCarthy |
| 5,164,544 A | 11/1992 | Snodgrass et al. |
| 5,203,711 A | 4/1993 | Bogiel |
| 5,252,086 A * | 10/1993 | Russell et al. ............. 439/215 |
| 5,277,609 A * | 1/1994 | Ondrejka ..................... 439/215 |
| 5,336,097 A | 8/1994 | Williamson, Jr. et al. |
| 5,595,495 A | 1/1997 | Johnson et al. |
| 5,941,720 A | 8/1999 | Byrne |
| 5,957,714 A | 9/1999 | Johnson et al. |
| 6,036,516 A | 3/2000 | Byrne |
| 6,642,450 B1 * | 11/2003 | Hsiao .......................... 174/53 |
| 2001/0008814 A1 | 7/2001 | Tsukamoto et al. |

FOREIGN PATENT DOCUMENTS

GB 2284715 * 6/1995

* cited by examiner

Primary Examiner—Briggitte R. Hammond
(74) Attorney, Agent, or Firm—Taylor & Aust, P.C.

(57) ABSTRACT

An expandable powerway for use in a modular wall panel, which includes a primary distribution assembly and an add-on distribution assembly. The primary distribution assembly includes at least one modular connector and a plurality of electrical circuits connected to the at least one modular connector. The an add-on distribution assembly includes at least one supplemental modular connector and a plurality of supplemental electrical circuits connected to the at least one supplemental modular connector. The primary distribution assembly is mechanically coupled but not electrically coupled to the add-on distribution assembly.

23 Claims, 5 Drawing Sheets

ADD-ON ELECTRICAL DISTRIBUTION ASSEMBLY

CROSS REFERENCE TO RELATED APPLICATIONS

This is a non-provisional application based upon U.S. provisional patent application Ser. No. 60/518,720, entitled "ADD-ON PASS THRU ASSEMBLY", filed Nov. 10, 2003.

BACKGROUND OF THE INVENTION

1. Field of the Invention

The present invention relates to modular furniture, and, more particularly, to an electrification method and apparatus for a modular wall panel.

2. Description of the Related Art

Modular wall panel systems are used extensively in commercial, industrial and other settings to define workspace, provide privacy, control traffic flow, and minimize noise. Wall panel systems can also provide suitable structures for use with desks, tables, shelves, trays, other work surfaces and the like as well as with other furniture, components, equipment and material such as may be used in a commercial or industrial setting. In addition, wall panel systems can be advantageously integrated into the design and decoration of a commercial or industrial setting to improve the aesthetic appeal of the environment.

Wall panel systems may include individual wall panel units of various types and sizes. Wall panel units may be full height floor-to-ceiling walls or may be walls of less than floor-to ceiling height, or may include a combination of such walls of varying heights. Wall panel units may totally enclose or only partially enclose specific areas depending upon the particular needs of the site. An advantage of wall panel systems of this type is that they can be reconfigured relatively easily compared to permanent wall structures (such as studs and drywall plaster, or concrete).

In using wall panel systems, it is usually necessary to provide electricity to workstations located in and around the wall panel units. Present demands for electrical power consumption may require the provision of several circuits through a wall panel system. Present demands may even require the use of one or more isolated circuits that do not share a neutral or ground wire with other circuits in order to minimize electrical interference that might cause problems for computer or communication systems. Accordingly, it is desirable that an electric distribution system be provided with the wall panel system that is easy to install yet provides a high level of electrical service.

Related to the feature of ease of installation is reconfigurability. Wall panel systems may be preferred over permanent wall structures because of the relative ease with which such systems can be reconfigured to adapt to the needs of a changing and/or expanding business. In particular, where a wall panel system is of high quality and durable, it is possible that at some point during the use of the wall panel system, the user's need changes and a reconfiguration of the wall panel system will be desired. In such a case, it is advantageous to have an electrical distribution system that can be easily reconnected and reconfigured at the user's site either in the event of a reconfiguration of the wall panel system or in order to provide a different level of electric service to an existing wall panel system.

The increased use of electrified office equipment such as computers, monitors, facsimile machines, copiers, printers, scanners, clocks and the like tend to increase the need for electrical service within an industrial, commercial, educational and other environments. This increased electrical usage combined with the reconfigurable nature of the modular furniture environment creates a need for electrical service which can be easily expandable. It is further desired that the electrical service be expanded without interrupting the existing electrical service.

A power distribution system for the electrification of modular wall panels is known, for example, which includes a plurality of electrical power lines and a plug-receiving receptacle mounted adjacent the power lines for interconnection therewith. Receptacle contacts mounted on the receptacle and a plurality of interchangeable circuit control modules allow for selectively interchangeably interconnecting the plug-receiving receptacle with different power distribution circuits. However, such a system does not expand the electrical system within the modular wall panel, but instead, merely reconfigures it to connect certain receptacles with selected conductors.

What is needed in the art is an apparatus and method for expanding electrical service in an existing modular wall panel which is compatible with existing electrical circuits and which can be installed without the need for reconfiguring existing circuits.

SUMMARY OF THE INVENTION

The present invention provides an add-on electrical distribution assembly which provides additional electrical circuits in a modular wall panel, and which is compatible with the existing electrical distribution within the wall panel.

The invention comprises, in one form thereof, an expandable powerway for use in a modular wall panel, which includes a primary distribution assembly and an add-on distribution assembly. The primary distribution assembly includes at least one modular connector and a plurality of electrical circuits connected to the at least one modular connector. The an add-on distribution assembly includes at least one supplemental modular connector and a plurality of supplemental electrical circuits connected to the at least one supplemental modular connector. The primary distribution assembly is mechanically coupled but not electrically coupled to the add-on distribution assembly.

An advantage of the present invention is that it can add additional electrical circuits in an existing modular wall panel.

Another advantage of the present invention is that it is compatible with existing electrical circuits within the modular wall panel.

Yet another advantage of the present invention is that it can be installed without the need for reconfiguring existing circuits.

Yet another advantage of the present invention is that it can provide additional receptacles to a modular wall panel without overloading the existing electrical circuits.

Yet another advantage of the present invention is that it can pass through additional electrical circuits to adjoining modular wall panels thereby increasing the electrical distribution at the adjoining modular wall panels.

Yet another advantage of the present invention is that it can provide additional electrical capacity in a modular wall panel which either can be installed initially or is field retrofitable.

Yet another advantage of the present invention is that it can use existing raceways, base trim panels, receptacle openings, and panel/distribution assembly mounting system.

Yet another advantage of the present invention is that it can use existing raceway mounting and can be installed from one side of a modular wall panel.

Yet another advantage of the present invention is that it fits in the same panel space as an existing distribution system.

Yet another advantage of the present invention is that the snap-on design minimizes installation time.

Yet another advantage of the present invention is that it is compatible with 5, 8 and 10–18 wire configurations.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
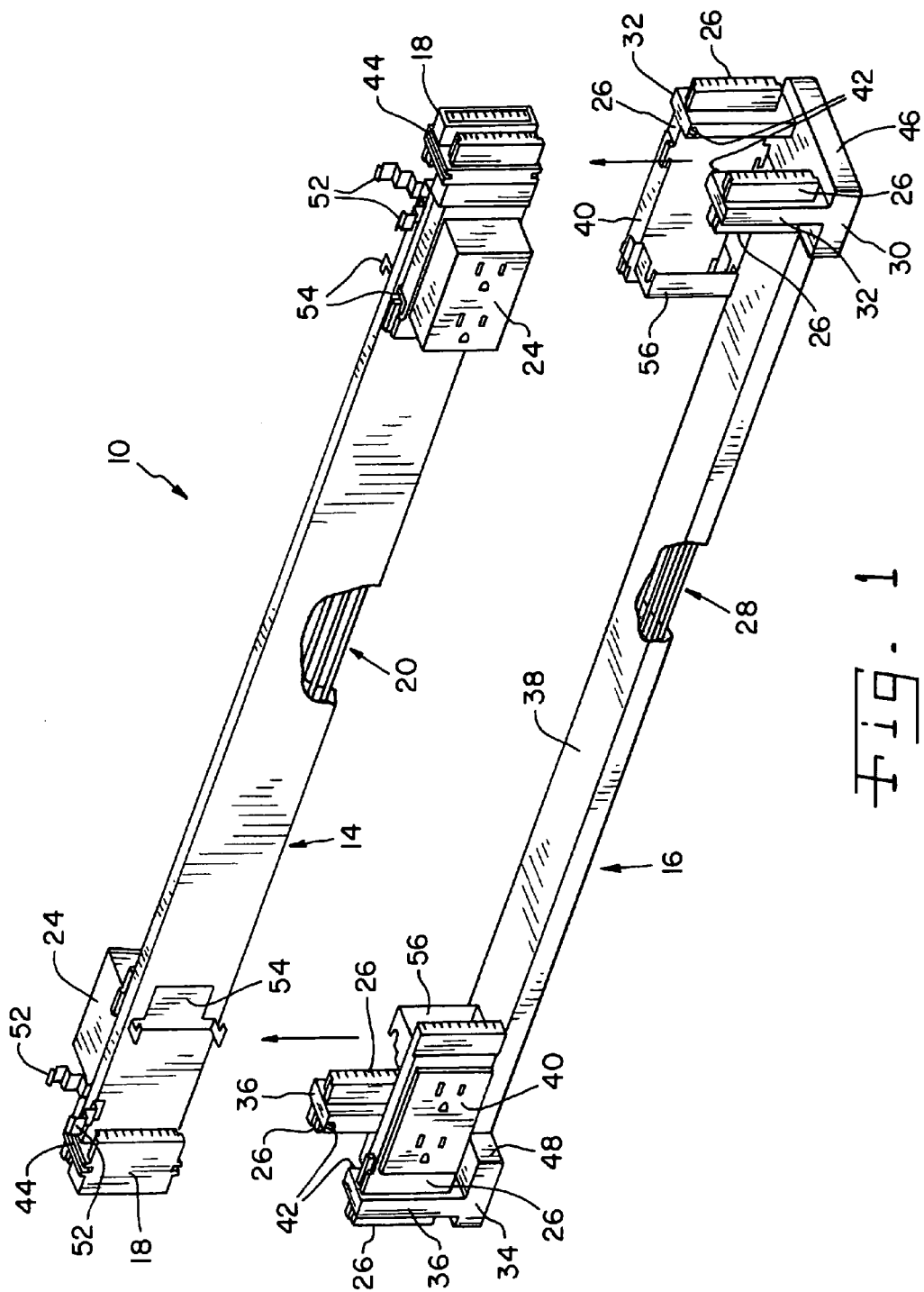
FIG. 1 is an exploded perspective view of an embodiment of an expandable powerway of the present invention where a primary distribution assembly is separated from an add-on distribution assembly.
Figure 3:
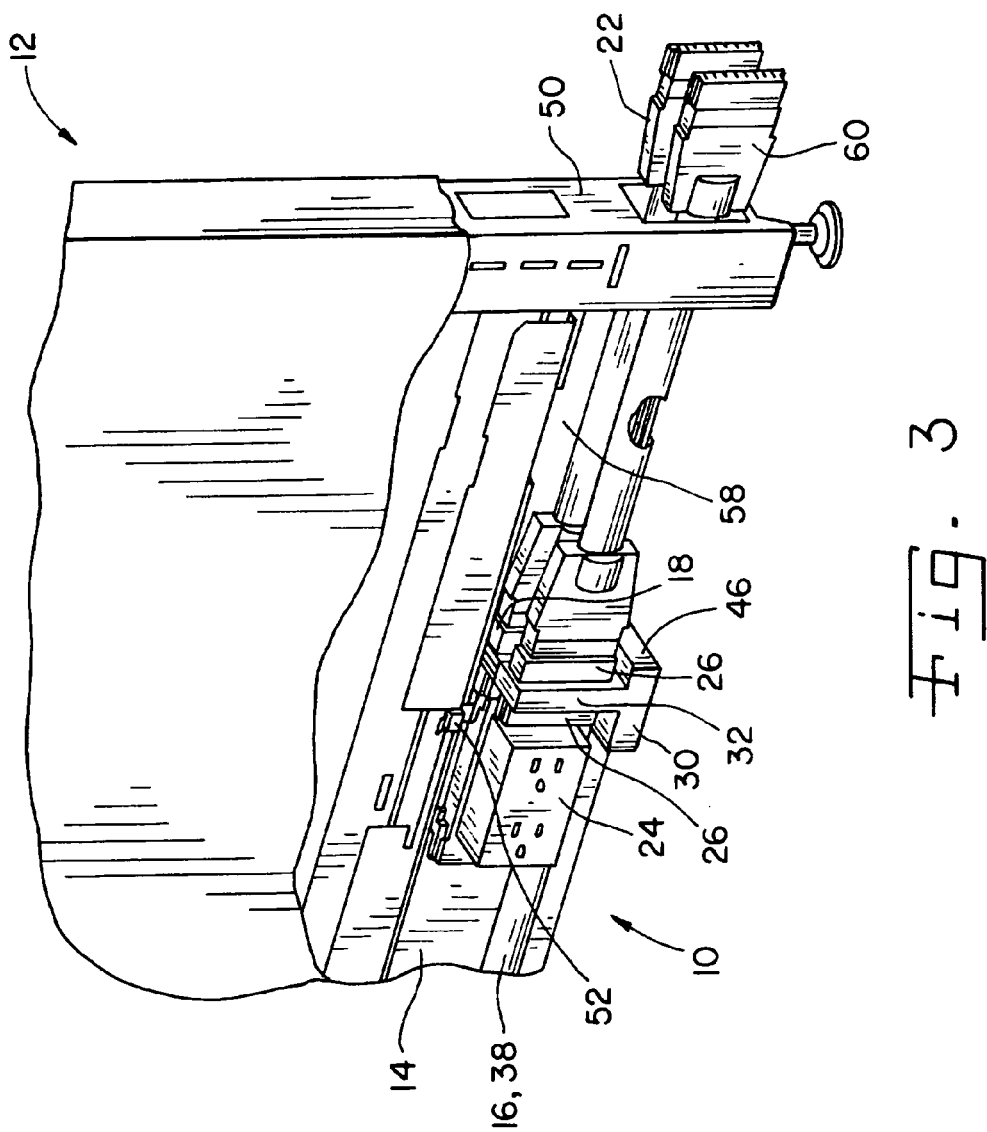
FIG. 3 is a perspective view of an embodiment of a modular wall panel of the present invention illustrating dual jumper cables, one jumper cable for a primary distribution assembly and a second jumper cable for an add-on distribution assembly.

Referring now to the drawings, and more particularly to FIGS. 1 and 3, there is shown an expandable powerway 10 for use in a modular wall panel 12 which generally includes a primary distribution assembly 14 and an add-on distribution assembly 16.

Primary distribution assembly 14 includes at least one modular connector 18 and a plurality of electrical circuits 20 connected to modular connectors 18. Modular connectors 18 can be connected to a source of electrical power (not shown) through a jumper cable 22, or other elements, to provide electrical service to primary distribution assembly 14, and can also connect to modular duplex receptacles 24. For example, electrical circuits 20 can include eight conductors with four line conductors, two neutral conductors and two ground conductors, which conductors can provide electrical service for sixteen receptacles 24. The line and ground conductors can be twelve gauge wire and the neutral conductors can be ten gauge wire, for example. Alternatively, electrical circuits 20 can include ten conductors with five line conductors, three neutral conductors and two ground conductors. Although the conductor configurations described above are typical, electrical circuits 20 are not limited to these configurations. The terminals within modular connectors 18 can be connected to all of the conductors of electrical circuits 20 (one terminal per conductor), or can be connected to a subset of the conductors.

Figure 2:
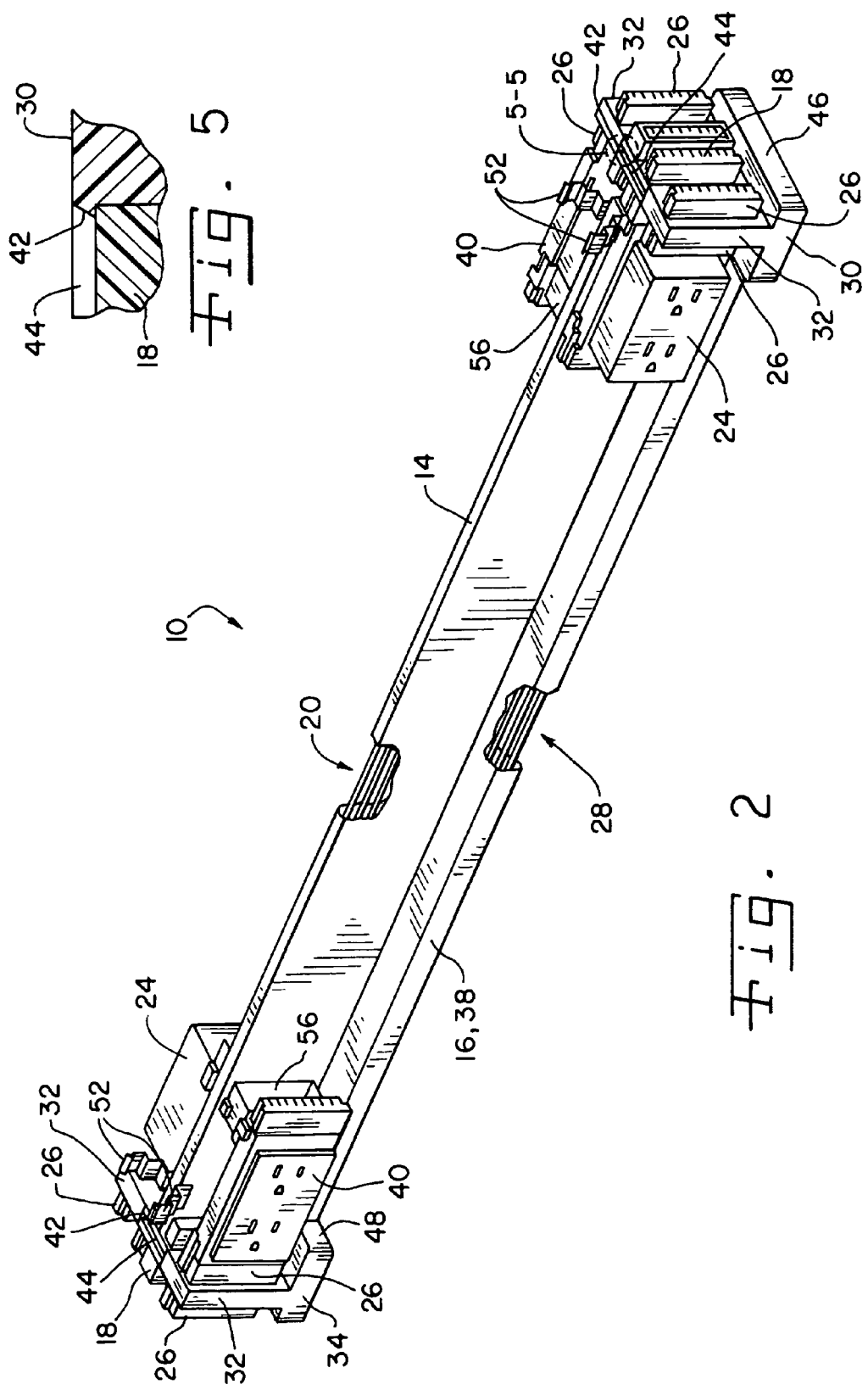
FIG. 2 is a perspective view of the expandable powerway of FIG. 1 where the primary distribution assembly is connected to the add-on distribution assembly.

Add-on distribution assembly 16 includes at least one supplemental modular connector 26 and a plurality of supplemental electrical circuits 28 connected to supplemental modular connectors 26. As shown in FIGS. 1 and 2, primary distribution assembly 14 is mechanically coupled but not electrically coupled to add-on distribution assembly 16. Add-on distribution assembly 16 includes a first distribution block 30 which has at least one first opposed connector pair 32 each with at least one supplemental modular connector 26. A second distribution block 34 has at least one second opposed connector pair 36 each with at least one supplemental modular connector 26. A channel 38 is connected to both first distribution block 30 and second distribution block 34. First distribution block 30, second distribution block 34 and channel 38 are configured for holding primary distribution assembly 14. Supplemental electrical circuits 28 are connected to both first distribution block 30 and second distribution block 34, and their respective connectors and connector terminals.

Supplemental electrical circuits 28 are at least partially disposed within channel 38. Supplemental electrical circuits 28 can typically include eight conductors with four line conductors, two neutral conductors and two ground conductors, which conductors can provide electrical service for sixteen supplemental modular receptacles 40, thereby increasing the electrical conductors and electrical capacity available to modular wall panel 12 and/or a wall panel system associated therewith. The line and ground conductors can be twelve gauge wire and the neutral conductors can be ten gauge wire, for example. Alternatively, electrical circuits 28 can include ten conductors with five line conductors, three neutral conductors and two ground conductors. Although the conductor configurations described above are possible, electrical circuits 28 are not limited to these configurations. The terminals within supplemental modular connectors 26 can be connected to all of conductors of electrical circuits 28 (one terminal per conductor), or can be connected to a subset of the conductors.

Figure 4:
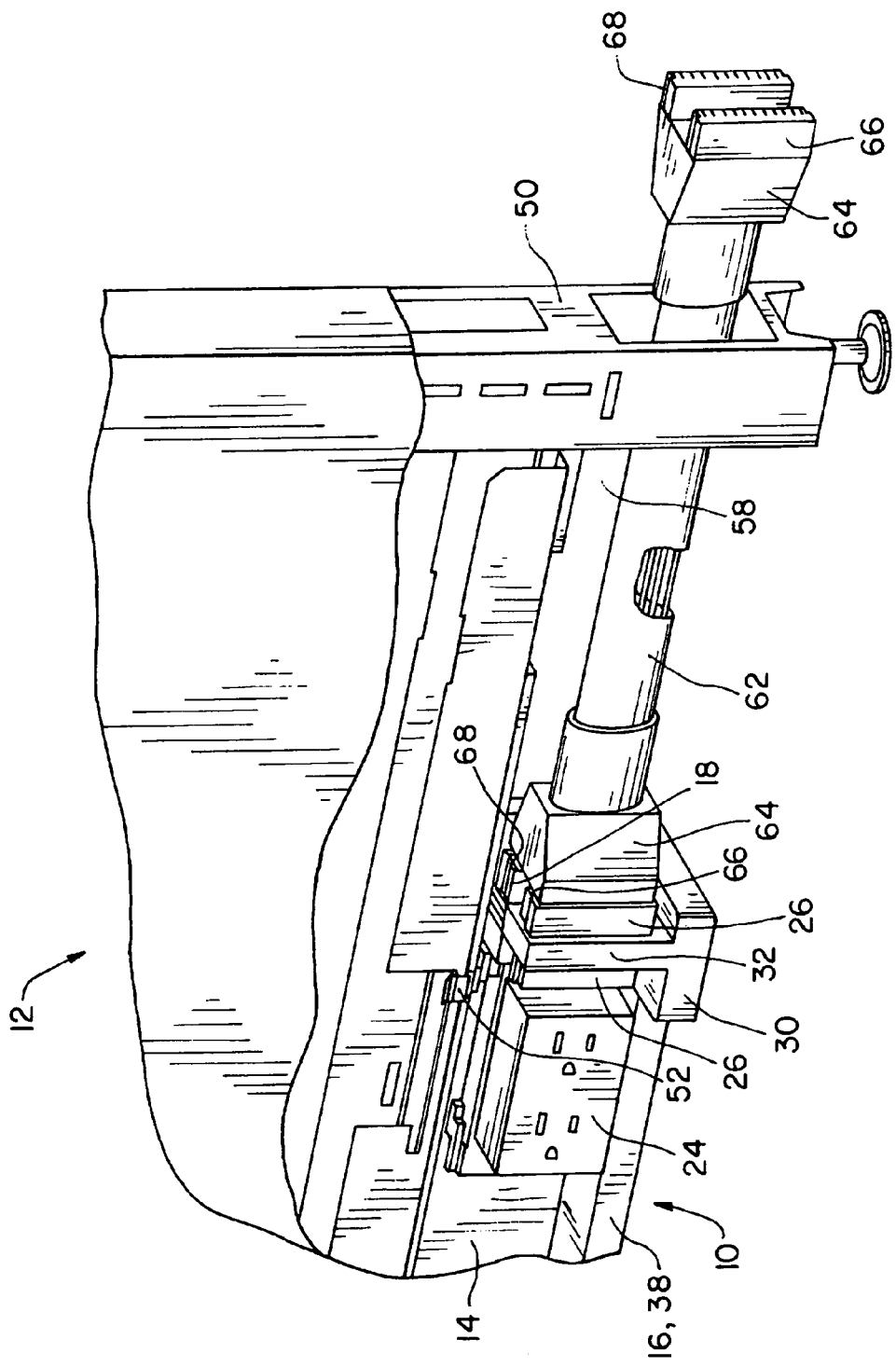
FIG. 4 is a perspective view of an embodiment of a modular wall panel of the present invention illustrating a jumper cable with a dual connector head, one connector for a primary distribution assembly and a second connector for an add-on distribution assembly.
Figure 5:
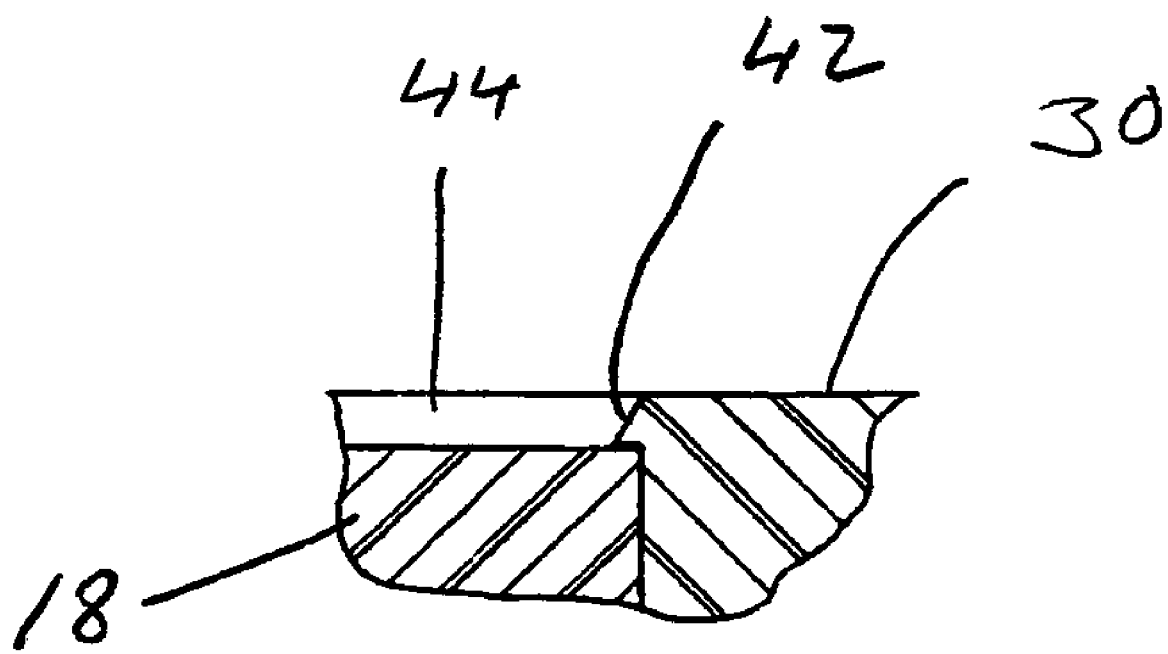
FIG. 5 is a section view of detail 5—5 of FIG. 2.

As shown particularly in FIGS. 1, 2 and 5, at least one of first distribution block 30, second distribution block 34 and channel 38 is configured to snap onto primary distribution assembly 14. For the embodiment shown, at least one of first distribution block 30 and second distribution block 34 includes at least one mechanical connection in the form of ramp projection 42, but could also be configured with any suitable mechanical connection. At least one modular connector 18 includes a groove 44. At least one ramp projection 42 is inserted into at least one groove 44 when primary distribution assembly 14 is mechanically coupled to and snapped into add-on distribution assembly 16. Further, first distribution block 30 includes a first base 46, and one of first opposed connector pair 32 and another of first opposed connector pair 32 are connected in a U-shape with first base 46. Primary distribution assembly 14 is mounted within the U-shape, as shown particulary in FIGS. 2-4. Similarly, second distribution block 34 includes a second base 48, and one of second opposed connector pair 36 and another of second opposed connector pair 36 are connected in another U-shape with second base 48. Primary distribution assembly 14 is also mounted within this second U-shape.

Supplemental modular receptacles 40 can be connected to any of first opposed connector pairs 32 and second opposed connector pairs 36. The depth of supplemental modular receptacles 40 is reduced relative to modular receptacles 24 so that, when mounted to add-on distribution assembly 16 and primary distribution assembly 14, respectively, either of supplemental modular receptacles 40 or modular receptacles 24 extend an approximately equivalent distance from the centerline of frame 50 of modular wall panel 12. Frame attachment elements 52 connect primary distribution assembly 14 to frame 50. Brackets 54 can connect to both primary distribution assembly 14 and a modular receptacle 24 to support modular receptacle 24. At least one attachment element 56 can be connected to supplemental modular receptacle 40, where attachment elements 56 are configured for connection to primary distribution assembly 14, and more particularly, to brackets 54. As primary distribution assembly 14 and add-on distribution assembly 16 are snapped together, and as all modular receptacles are supported, expandable powerway 10 is held within raceway 58 of frame 50.

A jumper cable 22 can electrically connect primary distribution assembly 14 to a source of electrical power and/or other modular wall panels, and supplemental jumper cable 60 can electrically connect add-on distribution assembly 16 to a source of electrical power or other modular wall panels. Alternatively, a jumper cable 62 (FIG. 4) can be use to connect expandable powerway 10 to a source of electrical power and/or other modular wall panels. Jumper cable 62 includes a dual head connector 64 with a first head connector 66 and a second head connector 68. First head connector 66 is connected to first distribution block 30 (or alternatively second distribution block 34) for connecting expandable powerway 10, and more particularly add-on distribution assembly 16, to a source of electrical power and/or other modular wall panels. Second head connector 68 is connected to primary distribution assembly 14 and is configured for connecting primary distribution assembly 14 to a source of electrical power and/or other modular wall panels. First head connector 66 and second head connector 68 are connected to different conductors within jumper cable 62.

In use, the present invention provides a method of expanding electrical capacity within a modular wall panel 12, including the steps of: providing modular wall panel 12 having frame 50 with raceway 58, a primary distribution assembly 14 being within raceway 58, primary distribution assembly 14 including at least one modular connector 18 and a plurality of electrical circuits 20 connected to at least one modular connector 18; inserting an add-on distribution assembly 16 within raceway 58, add-on distribution assembly 16 including at least one supplemental modular connector 26 and a plurality of supplemental electrical circuits 28 connected to at least one supplemental modular connector 26; and mechanically coupling primary distribution assembly 14 but not electrically coupling to add-on distribution assembly 16. The method further includes the step of increasing a number of conductors and an electrical capacity within raceway 58. This increasing step can add four line conductors, two neutral conductors and two ground conductors within frame raceway 58. The method of the present invention can further include the step of snapping primary distribution assembly 14 onto at least one of a first distribution block 30 of add-on distribution assembly 16, a second distribution block 34 of add-on distribution assembly 16 and a channel 38 of add-on distribution assembly 16.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An expandable powerway comprising:
   a primary distribution assembly including at least one modular connector and a plurality of electrical circuits associated with said at least one modular connector; and
   an add-on distribution assembly including at least one supplemental modular connector and a plurality of supplemental electrical circuits associated with said at least one supplemental modular connector, said add-on distribution assembly being mechanically coupled but not electrically coupled to said primary distribution assembly, wherein said add-on distribution assembly includes a first distribution block which has at least one first opposed connector pair with at least one said supplemental modular connector; a second distribution block which has at least one second opposed connector pair with at least one said supplemental modular connector; a channel connected to both said first distribution block and said second distribution block, said first distribution block, said second distribution block and said channel configured for holding said primary distribution assembly.

2. The expandable powerway of claim 1, wherein said plurality of supplemental electrical circuits are connected to both said first distribution block and said second distribution block, said plurality of supplemental electrical circuits are at least partially disposed within said channel.

3. The expandable powerway of claim 1, wherein said plurality of supplemental circuits includes four line conductors, two neutral conductors and two ground conductors.

4. The expandable powerway of claim 1, further including a jumper cable having a dual head connector including a first head connector and a second head connector, said first head connector being connected to said first distribution block for connecting said expandable powerway to a source of electrical power, said second head connector being connected to said primary distribution assembly and configured for connecting said primary distribution assembly to said source of electrical power.

5. The expandable powerway of claim 1, wherein at least one of said first distribution block, said second distribution block and said channel is configured to snap onto said primary distribution assembly.

6. The expandable powerway of claim 5, wherein at least one of said first distribution block and said second distribution block includes at least one ramp projection, at least one said modular connector includes a groove, at least one said ramp projection is inserted into at least one said groove.

7. The expandable powerway of claim 1, further including at least one supplemental modular receptacle connected to at least one of said at least one first opposed connector pair and said at least one second opposed connector pair.

8. The expandable powerway of claim 7, further including at least one attachment element connected to said at least one supplemental modular receptacle, said at least one attachment element configured for connection to said primary distribution assembly.

9. The expandable powerway of claim 1, wherein said first distribution block includes a first base, one of said at least one first opposed connector pair and another of said at least one first opposed connector pair connected in a first U-shape with said first base, said primary distribution assembly mounted within said first U-shape.

10. The expandable powerway of claim 9, wherein said second distribution block includes a second base, one of said at least one second opposed connector pair and another of said at least one second opposed connector pair connected in a second U-shape with said second base, said primary distribution assembly mounted within said second U-shape.

11. A modular wall panel comprising:
a frame including a raceway;
an expandable powerway within said raceway, said expandable powerway including:
a primary distribution assembly including at least one modular connector and a plurality of electrical circuits associated with said at least one modular connector; and
an add-on distribution assembly including at least one supplemental modular connector and a plurality of supplemental electrical circuits associated with said at least one supplemental modular connector, said add-on distribution assembly being mechanically coupled but not electrically coupled to said primary distribution assembly, wherein said add-on distribution assembly includes a first distribution block which has at least one first opposed connector pair with at least one said supplemental modular connector; a second distribution block which has at least one second opposed connector pair with at least one said supplemental modular connector; a channel connected to both said first distribution block and said second distribution block, said first distribution block, said second distribution block and said channel configured for holding said primary distribution assembly.

12. The modular wall panel of claim 11, wherein said plurality of supplemental electrical circuits are connected to both said first distribution block and said second distribution block, said plurality of supplemental electrical circuits are at least partially disposed within said channel.

13. The modular wall panel of claim 11, wherein said plurality of supplemental circuits includes four line conductors, two neutral conductors and two ground conductors.

14. The modular wall panel of claim 11, further including a jumper cable having a dual head connector including a first head connector and a second head connector, said first head connector being connected to said first distribution block for connecting said expandable powerway to a source of electrical power, said second head connector being connected to said primary distribution assembly and configured for connecting said primary distribution assembly to said source of electrical power.

15. The modular wall panel of claim 11, wherein at least one of said first distribution block, said second distribution block and said channel is configured to snap onto said primary distribution assembly.

16. The modular wall panel of claim 15, wherein at least one of said first distribution block and said second distribution block includes at least one ramp projection, at least one said modular connector includes a groove, at least one said ramp projection is inserted into at least one said groove.

17. The modular wall panel of claim 11, further including at least one supplemental modular receptacle connected to at least one of said at least one first opposed connector pair and said at least one second opposed connector pair.

18. The modular wall panel of claim 17, further including at least one attachment element connected to said at least one supplemental modular receptacle, said at least one attachment element configured for connection to said primary distribution assembly.

19. The modular wall panel of claim 11, wherein said first distribution block includes a first base, one of said at least one first opposed connector pair and another of said at least one first opposed connector pair connected in a first U-shape with said first base, said primary distribution assembly mounted within said first U-shape.

20. The modular wall panel of claim 19, wherein said second distribution block includes a second base, one of said at least one second opposed connector pair and another of said at least one second opposed connector pair connected in a second U-shape with said second base, said primary distribution assembly mounted within said second U-shape.

21. A method of expanding electrical capacity within a modular wall panel, comprising the steps of:
providing a modular wall panel including a frame having a raceway, a primary distribution assembly being within said raceway, said primary distribution assembly including at least one modular connector and a plurality of electrical circuits associated with said at least one modular connector;
inserting an add-on distribution assembly within said raceway, said add-on distribution assembly including at least one supplemental modular connector and a plurality of supplemental electrical circuits associated with said at least one supplemental modular connector;
mechanically but not electrically coupling said primary distribution assembly with said add-on distribution assembly; and
snapping said primary distribution assembly onto at least one of a first distribution block of said add-on distribution assembly, a second distribution block of said add-on distribution assembly and a channel of said add-on distribution assembly.

22. The method of claim 21, further including the step of increasing a number of conductors and an electrical capacity within said raceway.

23. The method of claim 21, wherein said increasing step adds four line conductors, two neutral conductors and two ground conductors within said raceway.

* * * * *